United States Patent [19]

Mitchell

[11] Patent Number: 5,559,600
[45] Date of Patent: Sep. 24, 1996

[54] APPARATUS FOR DETECTING RELATIVE MOVEMENT

[75] Inventor: Donald K. Mitchell, Marblehead, Mass.

[73] Assignee: MicroE, Inc., Needham, Mass.

[21] Appl. No.: 383,700

[22] Filed: Feb. 1, 1995

Related U.S. Application Data

[63] Continuation of Ser. No. 293,090, Aug. 19, 1994, abandoned, which is a continuation of Ser. No. 878,494, May 5, 1992, abandoned.

[51] Int. Cl.$^6$ ................................ G01B 9/02
[52] U.S. Cl. ............. 318/356; 250/237 G; 250/231.16
[58] Field of Search ........................... 356/356, 363, 356/353; 250/237 G, 231.14, 231.16

[56] References Cited

U.S. PATENT DOCUMENTS

| Re. 33,669 | 8/1991 | Nomura et al. | 356/356 |
|---|---|---|---|
| 4,168,908 | 9/1979 | Cubalchini | 356/363 |
| 4,176,276 | 11/1979 | Kaul et al. | 250/237 |
| 4,631,416 | 12/1986 | Tratna, Jr. | 250/348 |
| 4,639,863 | 1/1987 | Harrison et al. | 364/200 |
| 4,655,587 | 4/1987 | Wijntjes et al. | 356/346 |
| 4,676,645 | 6/1987 | Taniguchi et al. | 356/356 |
| 4,703,176 | 10/1987 | Hahn et al. | 250/231 SE |
| 4,710,026 | 12/1987 | Magone et al. | 356/349 |
| 4,711,573 | 12/1987 | Wijntjes et al. | 356/346 |
| 4,728,193 | 3/1988 | Bartelt et al. | 356/356 |
| 4,731,772 | 3/1988 | Lee | 369/45 |
| 4,764,014 | 8/1988 | Makosch et al. | 356/351 |
| 4,776,698 | 10/1988 | Crosdale | 356/345 |

(List continued on next page.)

FOREIGN PATENT DOCUMENTS

| 0248277A2 | 6/1986 | European Pat. Off. |
| 2316248.3 | 3/1973 | Germany. |
| 1474049 | 1/1974 | United Kingdom. |

OTHER PUBLICATIONS

Alfons Ernst, *Digital Linear and Angular Metrology*, 2d ed. 1992 (translation by Robert W. Brown, Robert Franks, Herber Uhtenwoldt), pp. 17–19.

Hoetron Advertisement, Dr. Wai–Hon Lee, "A Simpler Test for Wavefront Quality," *Photonics Spectra*, Nov. 1992, p. 201.

G. N. Rassudova and F. M. Gerasimov, "The Use of Reflection Diffraction Gratings in Interference Systems for Measuring Linear Shifts. II," *Optical Spectroscope*, vol. 14, No. 215, (1963), pp. 295–300.

(List continued on next page.)

*Primary Examiner*—Jill Warden
*Assistant Examiner*—Long V. Le

[57] ABSTRACT

The apparatus disclosed herein employs a grating or scale which concentrates light at a preselected wavelength into the positive and negative first orders while minimizing the zeroth order. The scale is illuminated with monochromatic light of the selected wavelength and a poly-phase periodic detector has its sensing plane spaced from the scale a distance less than $$\frac{W}{2\tan\theta} \text{ where } \theta = \arcsin\left(\frac{\lambda}{P}\right)$$

where W is the width of the illuminated region of the scale. The period of the poly-phase detector is equal to P/2 so that each detector element or phase responds principally to interference between the positive and negative first orders without requiring magnification or redirection of the diffracted light. Preferably, the distance of the sensing plane from the scale is greater than $$\frac{W}{2\tan\phi} \text{ where } \phi = \arcsin\left(\frac{3\lambda}{P}\right)$$

so that the detector response does not include substantial components from diffraction orders higher than the first.

18 Claims, 4 Drawing Sheets

U.S. PATENT DOCUMENTS

| | | | |
|---|---|---|---|
| 4,776,701 | 10/1988 | Pettigrew | 356/356 |
| 4,815,850 | 3/1989 | Kanayama et al. | 356/349 |
| 4,829,342 | 5/1989 | Nishimura | 356/356 |
| 4,868,385 | 9/1989 | Nishimura | 250/231 |
| 4,870,635 | 9/1989 | Block et al. | 369/215 |
| 4,872,751 | 10/1989 | Hercher | 356/35.5 |
| 4,967,072 | 10/1990 | Nishimura | 250/231.16 |
| 4,970,388 | 11/1990 | Nishimura et al. | 210/237 G |
| 5,036,192 | 7/1991 | Ishizuka et al. | 250/231.16 |
| 5,043,775 | 8/1991 | Lee | 357/19 |
| 5,050,153 | 9/1991 | Lee | 369/112 |
| 5,066,130 | 11/1991 | Tsukiji et al. | 356/356 |
| 5,098,190 | 3/1992 | Wijntjes et al. | 356/356 |
| 5,104,225 | 4/1992 | Masreliez | 356/356 |
| 5,108,184 | 4/1992 | Brown et al. | 356/363 |
| 5,121,371 | 6/1992 | Farnsworth et al. | 369/44.26 |
| 5,129,725 | 7/1992 | Ishizuka et al. | 356/374 |
| 5,136,152 | 8/1992 | Lee | 250/211 |
| 5,159,408 | 10/1992 | Waldenmaier et al. | 356/357 |
| 5,162,955 | 11/1992 | Burdenko | 360/77.02 |
| 5,179,485 | 1/1993 | Tamayama | 360/106 |
| 5,182,610 | 1/1993 | Shibata | 256/349 |
| 5,196,970 | 3/1993 | Seko et al. | 360/77.03 |
| 5,227,930 | 7/1993 | Thanos et al. | 360/78.04 |
| 5,325,349 | 6/1994 | Taniguchi | 369/109 |

OTHER PUBLICATIONS

Michael Hercher and Geert Wyntjes, "Precision Angle Measurement With a Two-Frequency HeNe Laser,", *Proceedings of SPIE-The International Society for Optical Engineering*, Jan. 15–16, 1987, Vo. 741, pp. 174–185.

Lawrence Mertz, "Optical homodyne phase metrology," *Applied Optics*, vol. 28, No. 5, Mar. 1, 1989, pp. 1011–1014.

Lawrence Mertz, "Complex Interferometry", *Applied Optics*, vol. 22, No. 10, May 15, 1983, pp. 1530–1534.

Lawrence Mertz, "Real–time Fringe–Pattern Analysis", *Applied Optics*, vol. 22, No. 10, May 15, 1983, pp. 1535–1539.

Lawrence Mertz, "Phase Estimation with Few Photons," *Applied Optics*, vol. 23, No. 10, May 15, 1994, pp. 1638–1641.

Sharp Corporation Japan brochure, "Laser Diodes,", Mar. 1992.

APPARATUS FOR DETECTING RELATIVE MOVEMENT

This is a continuation of application Ser. No. 08/293,090 filed on Aug. 19, 1994, now abandoned, which is a continuation of application Ser. No. 07/878,494 filed on May 5, 1992, now abandoned.

BACKGROUND OF THE INVENTION

The present invention relates to an optical instrument for measuring displacement and more particularly to such an instrument which utilizes diffraction of monochromatic light from a scale or grating which is movable relative to a light source or sensing head.

A number of systems have been proposed heretofore for measuring relative displacement utilizing diffraction of light from an optical grating. Examples of such prior art systems may be seen in the Pettigrew U.S. Pat. No. 4,776,701; the Kanayama et al. U.S. Pat. No. 4,815,850; and the Taniguchi et al. U.S. Pat. No. 4,676,645. A commercially available system of this type is sold by Optra, Inc. of Beverly, Mass. under its trademark "Nanoscale". Each of these prior art systems, however, involves magnification or separation of the different diffraction orders obtained back from the diffraction grating which are then brought back together and interfered. Typically, fairly large numbers of optical components are required and the several components must be accurately spaced and aligned in order for the instruments to perform in accordance with their respective designs.

Among the several objects of the present invention may be noted the provision of apparatus for detecting relative displacement which employs a minimum of components; the provision of such a system in which tolerance of spacing and alignment of system components is relatively great; the provision of such an apparatus which is easily manufactured; the provision of such apparatus in which sensing components can be implemented using integrated circuit techniques; the provision of such apparatus which can provide measurement with high accuracy; the provision of such apparatus which is highly reliable and which is of relatively simple and inexpensive construction. Other objects and features are in part apparent and in part pointed out hereinafter.

SUMMARY OF THE INVENTION

The apparatus of the present invention utilizes a scale or grating which, for a preselected wavelength, concentrates diffracted light into the positive and negative first orders. The scale is relatively movable with respect to a source providing monochromatic light of the selected wavelength and which illuminates a region of the scale having a width W along the length of the scale. A poly-phase periodic detector is spaced close to the scale so that each detector phase or element responds principally to interference between the positive and negative first orders diffracted from the scale without intermediate reflection or magnification.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
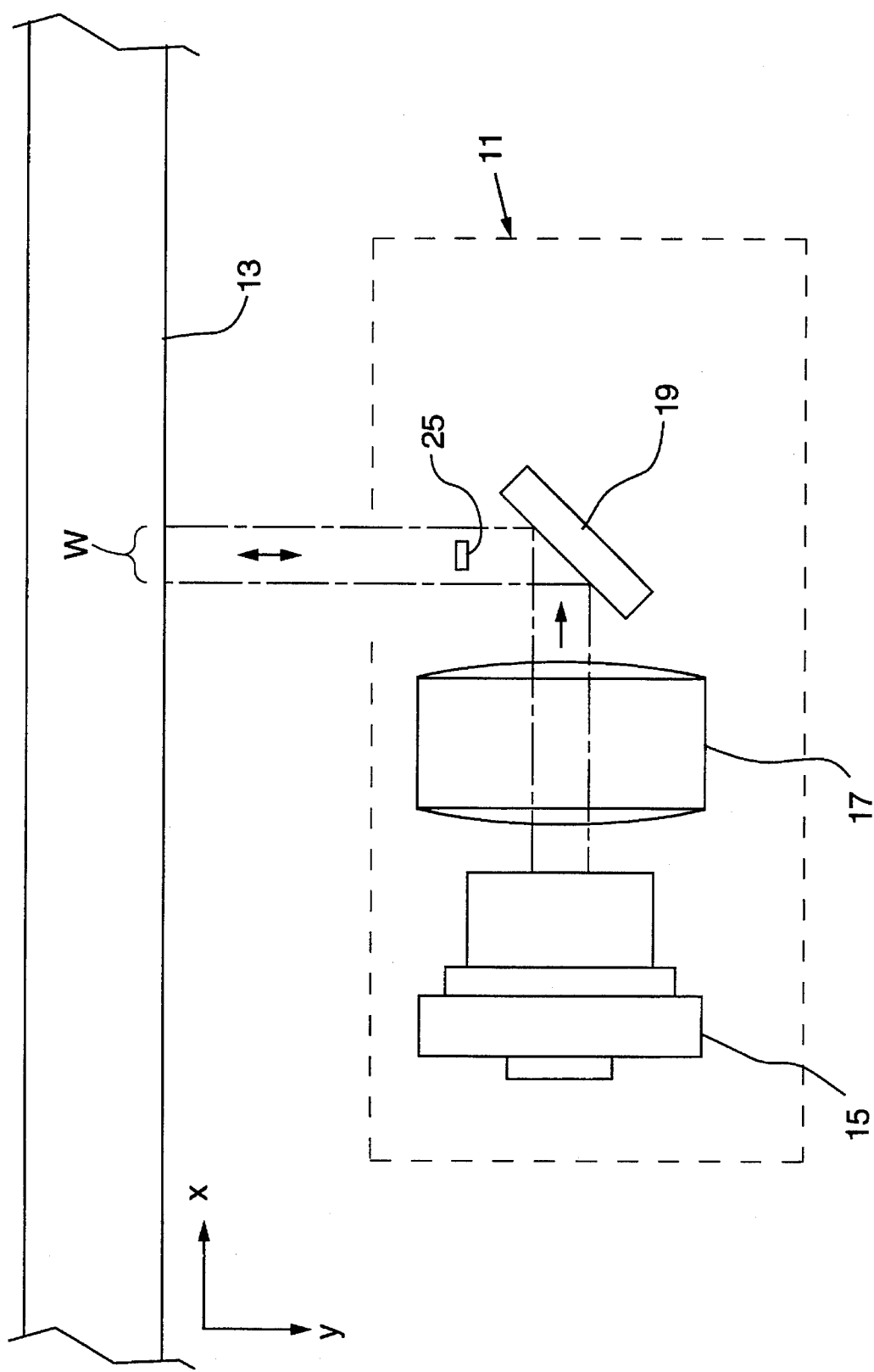
FIG. 1 is a top diagrammatic view of displacement sensing apparatus in accordance with the present invention.

For convenience in description, FIG. 1 is described as being a top view although, as will be apparent to those skilled in the art, the apparatus can be operated in any orientation. As indicated previously, the apparatus of the present invention operates to detect or sense relative movement or displacement between a sensing head, designated generally by reference character 11, and a scale or grating 13. The sensing head 11 incorporates a monochromatic light source, preferably a semiconductor laser as indicated by reference character 15. Semiconductor laser 15 provides essentially monochromatic light having a wavelength designated $\lambda$. Again, for convenience in description only, the direction of relative movement is designated the X-axis, this being along the length of the scale, while distance from the face of the scale is considered to be measured along the Y-axis. Correspondingly, the Z-axis is considered to be vertical or orthogonal to the plane of the drawing. The scale 13 is ruled parallel to the Z-axis.

Figure 3:
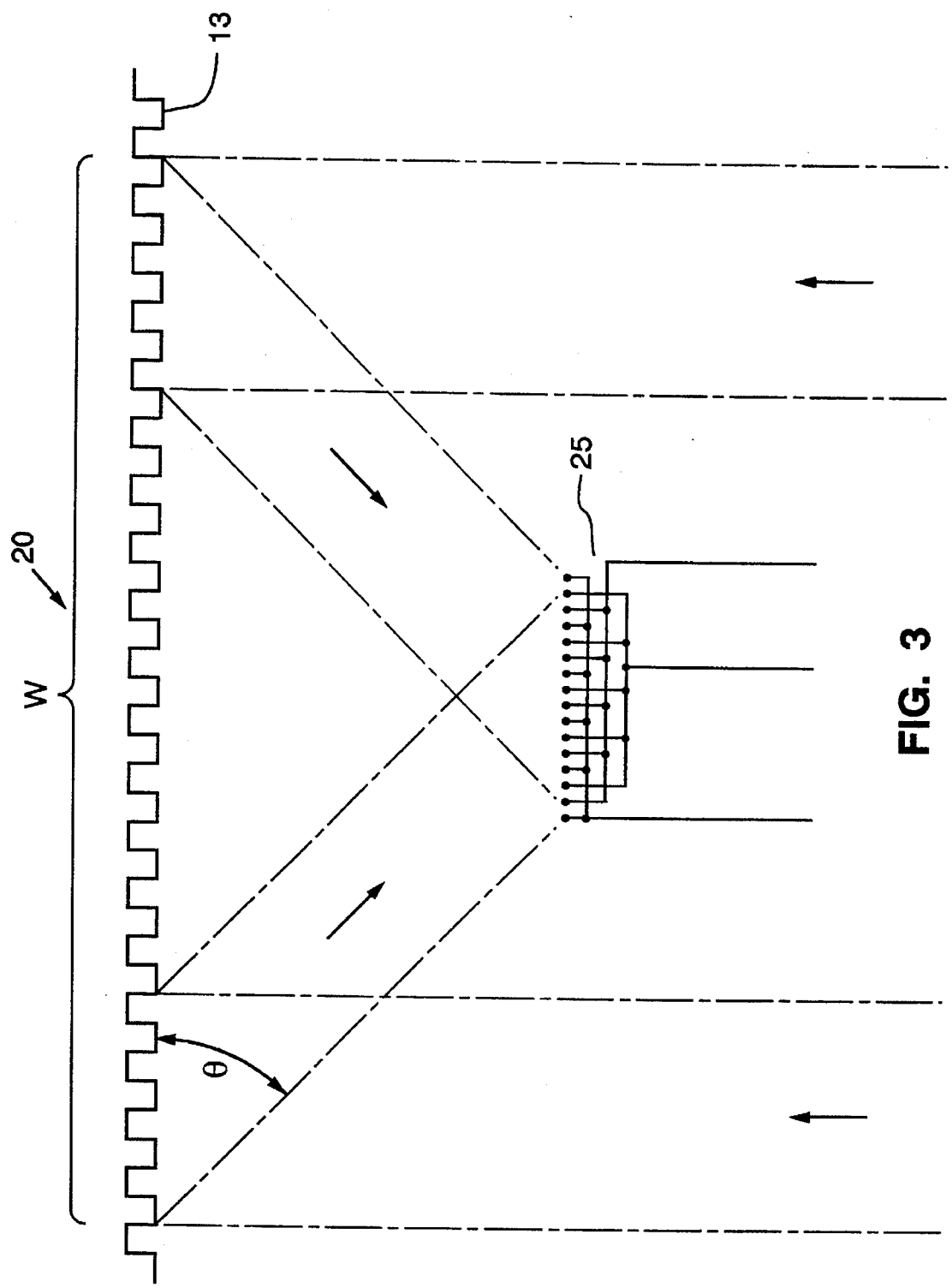
FIG. 3 is a diagrammatic illustration, with exaggerated scale spacing and diffraction angles, illustrating the operation of a periodic multi-phase detector employed in the apparatus of FIG. 1 in relation to light diffracted from a scale or grating.

As will be apparent from the description following, the scale 13 employed in the embodiment illustrated operates in reflection and the blaze characteristic is tailored to concentrate light diffracted at a selected wavelength into the positive and negative first orders and to minimize the zeroth order. As is understood by those skilled in the art, such a characteristic is obtained principally by employing a depth of blaze which is $\lambda/4$, i.e. a quarter wavelength, as well as by shaping the blaze surface as shown in FIG. 3. It should be understood that an essentially equivalent scale can be designed to operate in transmission.

Light from the semiconductor laser 15 is essentially colimated by a lens 17 and directed by a mirror 19 approximately orthogonally toward the face of the scale 13 illuminating a region 20 having a width W along the length of the scale. Light diffracted back from the scale 13 is detected by a poly-phase periodic detector 25. The period of the detector along the X-axis corresponds to the period of the interference pattern generated by interference of the positive and negative first orders diffracted from the scale 13 and is thus equal to P/2. The width of the active area of the detector 25 is preferably substantially smaller than the width of the illuminated region on the scale 13. While the detector 25 is shown as though being in the path of the light beam proceeding from the mirror 19 to the scale 13, it can in fact be located above or below the beam since exact orthogonality of the beam to the scale surface in the Z direction is not required.

Figure 2:
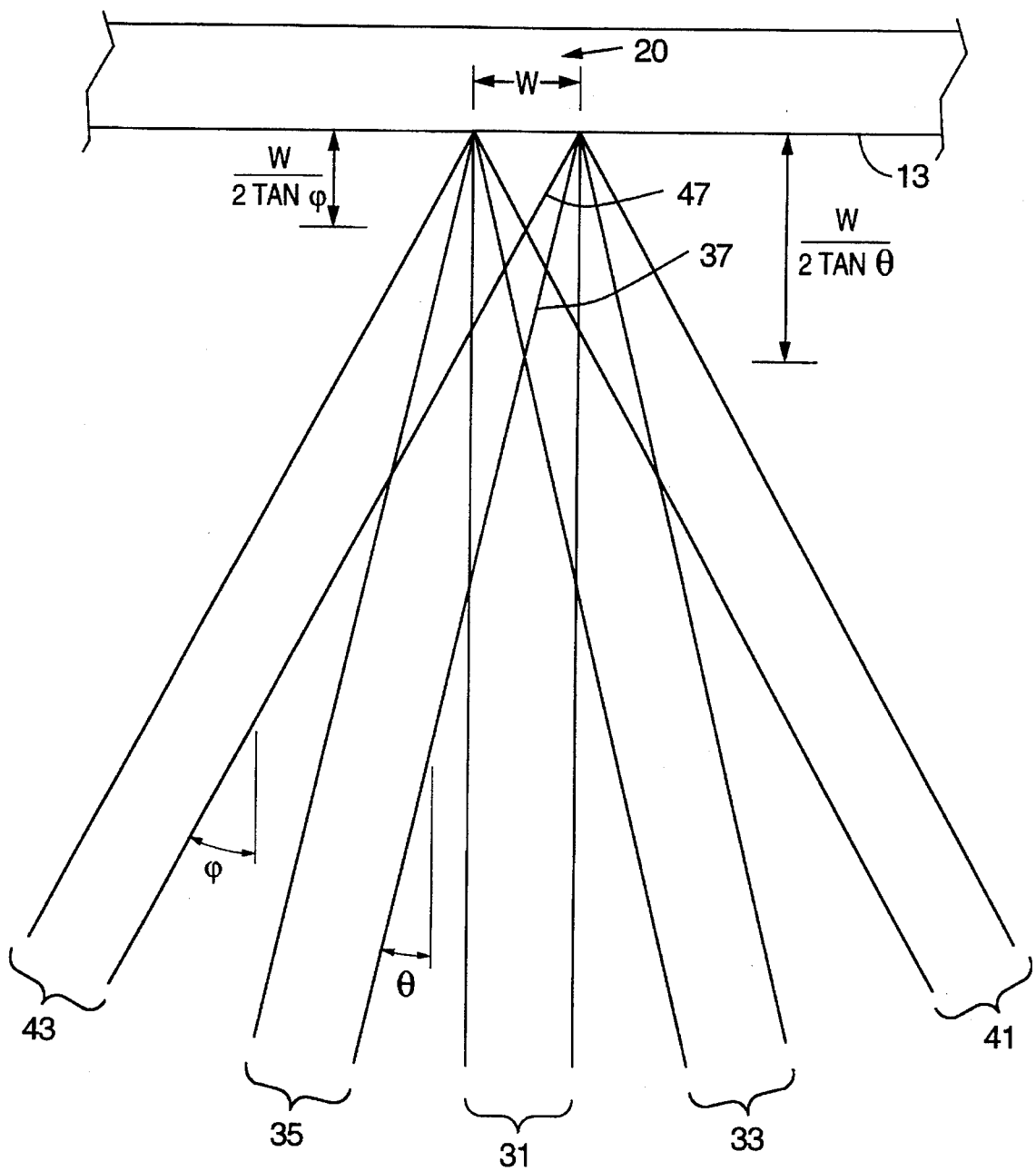
FIG. 2 is a diagram illustrating where different orders interfere in regions close to a diffraction scale employed in the apparatus of FIG. 1.

Referring now to FIG. 2, a region of width W along the length of the scale 13 is illuminated by the beam from the laser light source. The zeroth order is reflected essentially directly back, this beam being indicated by reference character 31. The positive first order is illustrated as being diffracted at an angle θ to the right, this beam being indicated by reference character 33 while the negative first order, designated by reference character 35, is diffracted to the left by the same angle. As is understood by those skilled in the art, the angle θ is equal to arcsin (λ/P) where P is the period of the scale blaze along the X-axis.

As may be seen, there exists a triangular region, designated by reference character 37, where the positive and negative first orders will interfere directly without any intermediate reflection or magnification. This region extends to a distance from the scale equal to W/(2 tan θ) and may be considered a region of near field interference.

To avoid confusion with the term "near field interference" in the Fresnel interference sense, the region of interference of interest in the present invention is more accurately described as a region of "pre-separation" interference, i.e. interference before the positive and negative orders diverge. In this region, the positive and negative orders interfere directly. As can be seen from FIG. 2, this pre-separation interference region 37 occurs before the positive first order beam 33 and negative first order beam 35 have separated from one another. Thereafter, separation occurs at the distance W/(2 tan θ) from the scale. In accordance with the present invention, the detector 25 is located within this region.

While the blaze characteristics can be tailored to substantially eliminate the zeroth and even orders of diffraction from the scale 13, some appreciable energy will typically remain in the odd orders. With reference to FIG. 2, the positive and negative third order beams are designated by reference characters 41 and 43, respectively. As is understood by those skilled in the art, the angle from normal at which each of these beams depart is φ where φ=arcsin (3λ/P). There correspondingly exists a triangular region of pre-separation interference, this region being designated by reference character 47. This region extends from the scale for a distance of $$\frac{W}{2 \tan \phi}$$

Preferably, the detector 25 is located further from the scale than the region of pre-separation interference from the positive and negative third orders so that the signals obtained correspond most closely with the sine wave characteristic of the pure first order interference pattern. Preferably, the detector 25 is located just outside of the apex of the region 47 so as to allow maximum detector width. As will be apparent, the whole active area of the detector should be within the region of the desired interference.

In view of this explanation, it can be seen that it is desirable that the designed width of the illuminated region 20 correspond to the designed spacing of the sensing plane from the diffraction scale. However, it should be understood that illumination beyond the designed width does not prevent the desired interference but, rather, only allows some contribution from higher diffraction orders since portions of a broadened region of illumination may allow light leaving at a larger diffraction angle to reach the detector. Thus, the problem of mismatching of illuminated region width to detector spacing is more in the nature of a gradual degradation rather than a failure to function as intended. Thus, it is a feature of the design of the present invention that spacing is not highly critical.

As indicated previously, the width of the active area of the detector 25 is smaller than the width of the illuminated region on the scale. Thus, as illustrated in FIG. 3, positive first order diffraction from a region on the left hand side of the region 20 can meet and interfere with negative first order diffracted light from a zone on the right hand side of the region 20 and the meeting light components can interfere at the sensing plane of the detector 25.

As indicated, the dimensions and angles are exaggerated in FIGS. 2 and 3 for the purpose of explanation. Dimensions and angles for a practical design may, for example be as follows. The light source is a semiconductor laser providing light at a wavelength of 780 nanometers. The scale 13 is ruled or blazed at 424 lines per inch (16.64 lines per millimeter) so that the period P is 60 microns. Accordingly, the angle of first order diffraction θ is 0.745 degrees, and the angle of third order diffraction φ is 2.2 degrees. Assuming that the width of the illuminated region is 1.0 millimeter, the pre-separation first order region of interference extends 38.5 millimeters from the scale while the pre-separation third order region of interference extends 12.8 millimeters from the scale.

Figure 4:
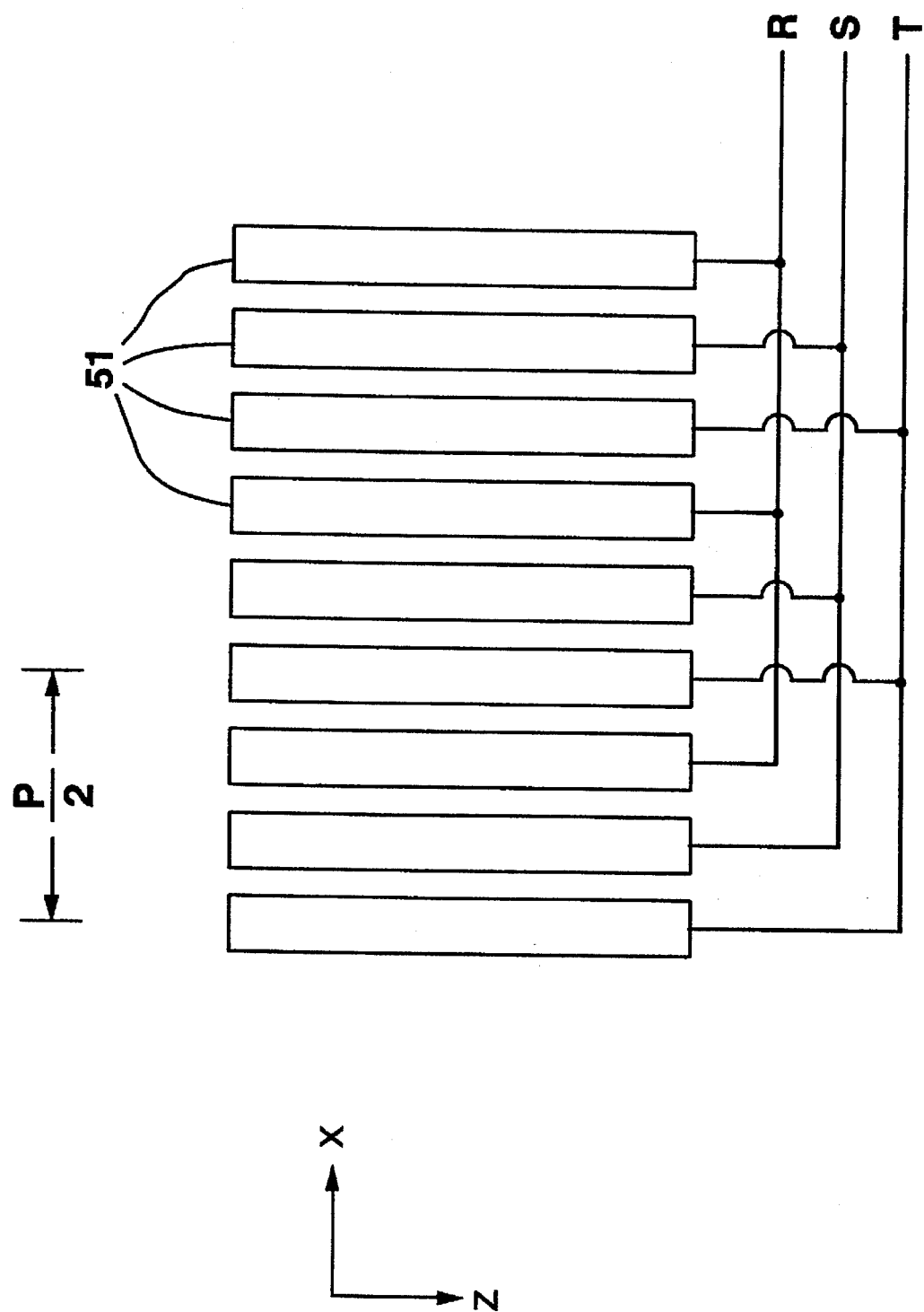
FIG. 4 is a diagram of the front of the detector of FIG. 3.

As is understood by those skilled in the art, the pattern of light intensity produced by interference of the positive and negative first order diffraction components will have a periodicity which is twice that of the scale itself. The detector 25 is constructed to have a matching periodicity, i.e. P/2 so that the contributions from the several elements in each phase of the detector combine additively. Preferably, the detector 25 is constructed as an integrated circuit comprising an array of narrow elongate photodiodes. Such an array of photodiodes is illustrated in FIG. 4. The individual photodiodes are indicated by reference character 51 and they are interconnected in a three-phase interdigitated fashion as illustrated so as to provide three output signals conveniently and conventionally designated as R, S, and T. The three diodes in each cycle or period are equally spaced so that the three signals requesting from the sensing of first order interference will be phased at 120° intervals. The same interconnection scheme is illustrated diagrammatically in FIG. 3. While two arrays providing Quadrature signals could define the relative displacement, it is presently preferred that three phases be implemented since it greatly simplifies the decoding and interpolation of the output signals by techniques which are well understood in the art.

While it is preferred that the three phases be interdigitated as illustrated, since that arrangement makes most efficient use of the available light energy, an arrangement simpler to fabricate can be implemented by offsetting the three phases in the Z-axis direction so as to simplify the interconnection of the various photodetector elements. Another alternative is to employ three, relatively large area photodetectors, each of which is provided with a respective mask for admitting light of the appropriate phase. Again, while this construction is simpler to implement, it is less efficient in the utilization of the available light energy.

A still further alternative is to provide a lenticular screen at the sensing plane which disperses the different phases at different angles after interference at the sensing plane so that spaced apart detectors can be utilized. The lenticular screen will thus have a periodicity of P/2 along the X-axis. In this case, the photo-electric detectors themselves need not be placed within the so-called region of pre-separation interference 37 but, rather, the sensing plane and the point of interference is at the lenticular screen which is within the region.

Similarly, while it is preferable that pure first order interference be achieved so as to provide the purest possible sinewave out of each of the three detector phases, some interference by other orders will not be overly objectionable in some applications and, by use of matching pattern tables, sufficiently accurate interpolations may be provided.

While the embodiment disclosed by way of example provides for sensing along a single axis, it should be understood that the technique of the present invention can be applied to a combined two-axis sensing device by utilizing a scale ruled in orthogonal directions, together with a respective detector for each direction. A single light source can serve both axes. Due to the orthogonality, there will be minimal interaction between movement along one axis with the sensing signals generated by movement along the other axis.

If the detectors and gratings are properly shaped to provide matching curvatures for the diffracted signal, or sufficiently narrow gratings were used, this invention can be effectively applied to a rotary encoder.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for detecting relative movement comprising a diffraction scale relatively movable with respect to a source of light and having a period P and a characteristic which concentrates light diffracted at a preselected wavelength $\lambda$ into the positive and negative first orders;

means for illuminating with light of wavelength $\lambda$ a region of said scale having a width W along the length of the scale;

a periodic detector having a sensing plane spaced from said scale a distance less than $$\frac{W}{2 \tan \theta} \text{ where } \theta = \arcsin\left(\frac{\lambda}{P}\right)$$

the period of said detector being equal to P/2 whereby said detector responds principally to interference at said sensing plane between the positive and negative first orders diffracted from said scale.

2. Apparatus as set forth in claim 1 wherein said sensing plane is spaced from said scale a distance greater than $$\frac{W}{2 \tan \phi} \text{ where } \phi = \arcsin\left(\frac{3\lambda}{P}\right)$$

3. Apparatus for detecting relative movement comprising;
   a source of monochromatic light of wavelength $\lambda$;
   a reflection diffraction scale relatively movable with respect to said source and having a period P and a characteristic which concentrates light diffracted at said wavelength $\lambda$ into the positive and negative first orders and which minimizes the zeroth order;
   means for directing light from said source onto a region of said scale having a width W along the length of the scale;
   a poly-phase periodic detector having a sensing plane spaced from said scale a distance less than $$\frac{W}{2 \tan \theta} \text{ where } \theta = \arcsin\left(\frac{\lambda}{P}\right)$$

the period of said detector being equal to P/2 whereby said detector responds principally to interference at said sensing plane between the positive and negative first orders diffracted from said scale.

4. Apparatus as set forth in claim 3 wherein said detector comprises an array of parallel elongate photodiodes.

5. Apparatus as set forth in claim 3 wherein said sensing plane is spaced from said scale a distance greater than $$\frac{W}{2 \tan \phi} \text{ where } \phi = \arcsin\left(\frac{3\lambda}{P}\right).$$

6. Apparatus for detecting relative movement comprising:
   a semiconductor laser providing monochromatic light of wavelength $\lambda$;
   an elongate reflective diffraction scale longitudinally relatively movable with respect to said laser, said scale being ruled transversely to its length with a period P and a characteristic which concentrates light diffracted at said wavelength $\lambda$ into the positive and negative first orders and which minimizes the zeroth order;
   means for directing light from said laser onto a region of said scale having a width w along the length of the scale;
   a plurality of elongate photoelectric detectors arranged in a planar parallel array spaced from said scale a distance less than $$\frac{W}{2 \tan \theta} \text{ where } \theta = \arcsin\left(\frac{\lambda}{P}\right)$$

said detectors being interconnected in a periodic multiphase array with the period being equal to P/2 whereby said detector responds principally to interference at said sensing plane between the positive and negative first orders diffracted from said scale.

7. Apparatus for detecting relative movement comprising:
   a diffraction grating relatively movable with respect to a source of light and having a period P and a characteristic which concentrates light diffracted at a preselected wavelength $\lambda$ into positive and negative first order beams which initially overlap and interfere with one another in a region of pre-separation interference and thereafter separate from one another;
   means for illuminating with light of wavelength $\lambda$, a region having a width W along the length of said grating; and
   a periodic detector having a sensing plane positioned within the region of pre-separation interference, wherein the period of said detector is equal to P/2 whereby said detector responds principally to interference at said sensing plane between the positive and negative first orders beams diffracted from said grating.

8. The apparatus of claim 7 wherein the region of pre-separation interference is located at a distance from the grating less than $$\frac{W}{2 \tan \theta} \text{ where } \theta = \arcsin\left(\frac{\lambda}{P}\right)$$

the period of said detector being equal to P/2.

9. The apparatus of claim 8 wherein the region of pre-separation interference is located at a distance greater than $$\frac{W}{2 \tan \phi} \text{ where } \phi = \arcsin\left(\frac{3\lambda}{P}\right)$$

10. The apparatus of claim 7 wherein the grating is a reflective grating.

11. The apparatus of claim 7 wherein the grating is a transmissive grating.

12. The apparatus of claim 7 wherein the light source is a laser diode.

13. The apparatus of claim 7 wherein the detector comprises an array of parallel elongate photo diodes.

14. A method for detecting relative movement of an object comprising positioning a diffraction grating for movement with the object, wherein the diffraction grating has a period P and a characteristic which concentrates light diffracted at a preselected wavelength $\lambda$ into positive and negative first order beams which initially overlap and interfere with one another in a region of pre-separation interference and thereafter separate from one another;

illuminating with light of wavelength $\lambda$, a region having a width W along the length of said grating; and positioning a sensing plane of a periodic detector within the region of pre-separation interference, wherein the period of said detector is equal to P/2 whereby said detector responds principally to interference at said sensing plane between the positive and negative first orders beams diffracted from said grating.

15. Apparatus for detecting relative movement of an object with respect to a beam of light substantially of wavelength $\lambda$ including:

a diffraction structure positioned for movement with the object and to be illuminated by the beam of light, wherein the diffraction structure has a period P and is shaped to produce positive and negative first order diffraction beams from the beam of light, and wherein the positive and negative first order diffraction beams initially overlap and interfere with one another in a region of pre-separation interference and thereafter separate from one another; and a periodic detector having a period of P/2 and a sensing plane which is positioned in the region of pre-separation interference, whereby the detector responds to the pre-separation interference between the positive and negative first order diffraction beams.

16. The apparatus of claim 15 wherein the interference structure is a diffraction grating.

17. The apparatus of claim 16 further including a source of light substantially of wavelength $\lambda$ which provides the beam of light, wherein the source of light and the periodic detector are positioned in a sensing head.

18. The apparatus of claim 16 wherein the beam of light has a width W along a length of the diffraction structure, so that the region of pre-separation interference is located at a distance from the interference structure which is less than $$\frac{W}{2 \tan \theta} \text{ where } \theta = \arcsin\left(\frac{\lambda}{P}\right)$$

and at a distance greater than $$\frac{W}{2 \tan \phi} \text{ where } \phi = \arcsin\left(\frac{3\lambda}{P}\right)$$

* * * * *